US007449856B2

(12) United States Patent
Valencia et al.

(10) Patent No.: US 7,449,856 B2
(45) Date of Patent: Nov. 11, 2008

(54) UNIVERSAL CONTROLLER FOR AUTOMATIC DOOR SYSTEMS

(75) Inventors: Michael A. Valencia, Hoffman Estates, IL (US); Joseph P. Madden, DesPlaines, IL (US); Gilbert F. Valencia, Hoffman Estates, IL (US); Robert L. Oakley, Chicago, IL (US)

(73) Assignee: Motion Access, L.L.C., Elk Grove Village, IL (US)

( * ) Notice: Subject to any disclaimer, the term of this patent is extended or adjusted under 35 U.S.C. 154(b) by 524 days.

(21) Appl. No.: 11/273,197

(22) Filed: Nov. 14, 2005

(65) Prior Publication Data

US 2007/0108927 A1 May 17, 2007

(51) Int. Cl.
*G05B 19/048* (2006.01)
*G05B 23/00* (2006.01)
*G06F 11/00* (2006.01)

(52) U.S. Cl. ........................ 318/478; 318/466; 318/282; 702/108; 702/113

(58) Field of Classification Search ................. 318/282, 318/286, 266, 466, 640; 702/57, 108, 113
See application file for complete search history.

(56) References Cited

U.S. PATENT DOCUMENTS 5,884,237 A * 3/1999 Kanki et al. ................ 318/466
6,075,333 A * 6/2000 Huddle ....................... 318/266
6,792,321 B2 * 9/2004 Sepe, Jr. ..................... 702/188
7,120,430 B2 * 10/2006 Christenson et al. ........ 455/419
7,127,838 B2 * 10/2006 Menze ........................ 37/196
7,181,369 B2 * 2/2007 Kanki et al. ................ 702/188
2004/0049319 A1 * 3/2004 Kanki et al. ................ 700/275
2005/0017663 A1 * 1/2005 Anderson et al. ........... 318/280
2007/0157642 A1 * 7/2007 Ferragut et al. ............... 62/139

* cited by examiner

*Primary Examiner*—Walter Benson
*Assistant Examiner*—Eduardo Colon Santana
(74) *Attorney, Agent, or Firm*—Law Office of John W. Harbst

(57) ABSTRACT

A universal controller for an automatic door system including a door carried on a frame for movement along a predetermined path of movement between open and closed positions. The universal controller includes a housing for mounting the controller in a stationary position relative to the door frame and an assembly including a processor carried by the housing for processing data operatively received from a plurality of sensors and relating to the operation of the movable door. The processor is configured to generate operational values which are transmitted to and control a drive motor used to move the door between the open and closed positions. The assembly further includes an arrangement for adjusting the operational values generated by the processor and transmitted to the drive motor. A modular harness connects the controller to the drive motor and to the sensors. An apparatus operably coupled to the modular harness identifies the particular drive motor and sensors used in combination with the automatic door system. A method for automatically controlling operation of an automatic door system having at least one door movable between open and closed positions in response to operation of an output drive of a bi-directional drive motor is also provided.

19 Claims, 6 Drawing Sheets

UNIVERSAL CONTROLLER FOR AUTOMATIC DOOR SYSTEMS

FIELD OF THE INVENTION

The present invention generally relates to automatically operated door systems and, more particularly, to a universal controller and a method for operating automatic door systems.

BACKGROUND OF THE INVENTION

In the past, ingress an egress to stores and the like have often been through swing-type doors that need to be manually opened and closed. Manually operating such doors, however, can be quite inconvenient especially when there is a large volume of pedestrian traffic passing into and out of a large store, or when persons needing access are laden with bulky items which need to set aside to allow for manual operation of the doors, followed by the extra effort of relifting and balancing of the items to be transported to or from the store. Manually operated swinging doors can also be hazardous to persons in close proximity to the doors, when passers through open the doors suddenly as they enter or exit the store. As will be appreciated, manually operated swinging doors can cause serious physical harm, to others.

In an effort to be more customer friendly, many supermarkets and other large stores utilize automatic swinging doors and sliding doors to facilitate customers ingress and egress to and from such stores. In such door systems, a single or double door panels are propelled by a drive system including a drive motor and a control system usually containing a microprocessor. All sorts of sensors are typically arranged in combination with such automatic door systems to assist the drive system in determining when to start or stop opening the doors, the speed at which the door panel(s) open and/or close, and a myriad of other factors for optimizing operation of the automatic doors.

Every day the store having such automatically controlled door systems is open for business, the door panel(s) is/are cyclically operated hundreds—if not thousands—times. As will be appreciated, when an automatic door system fails to properly operate, the ingress and egress means to the store or supermarket is adversely affected. Of course, the ability to allow customers into and/or from a supermarket or superstore has a significant impact on the willingness of a customer to return to such store. Accordingly, and when such automatic door systems fail to operate in the intended manner, it is imperative for such automatic door system to be returned to proper working order as quickly as possible.

Throughout the United States and foreign countries, there are numerous different automatic door manufacturers. Moreover, and for different reasons, different manufacturers frequently use different drive motors having different operating parameters for operating their specific door system. For example, the drive motor used in connection with one manufacturer's door system can be designed to develop a predetermined speed at a predetermined voltage while the drive motor used in connection with another manufacturer's door system may be designed to develop a different predetermined speed at said predetermined voltage. Moreover, the sensor technology used by different door manufacturers can vary between manufacturers. For example, the sensor technology used to determine the position of a drive shaft on the drive motor can vary or be totally different between differing door manufacturers. Accordingly, the controller for the doors is designed to operate with that particular system, drive motor and sensor technology.

Thus, when repairs to the automatically controlled system are required, the person called to affect the repair is frequently unable to successfully accomplish the repair since they do not have the required or necessary parts which fit or correspond to the particular door system that failed. Accordingly, the repairs are delayed until proper parts are ordered and shipped. Thereafter, the repair person must return to accomplish the desired repairs, thus, returning the door system to proper working order. In the interim, of course, the door system is disabled and ingress/egress to the facility is impaired.

Thus, there is a need and continuing desire for a universal controller which is compatible and readily works with automatic door systems of different manufacturers thereby significantly reducing the time required to return the automatic door system to proper working order.

SUMMARY OF THE INVENTION

In view of the above, and in accordance with one aspect, there is provided a universal controller for an automatic door system including at least one door carried on a door frame for movement along a predetermined path of movement between open and closed positions. The automatic door system includes a drive motor for moving the door between the open and closed positions and sensor technology for monitoring variable conditions of the door and motor. The universal controller includes a housing for mounting the controller in a stationary position relative to the door frame and an assembly including a processor carried by the housing for processing data operatively received from the sensor technology and relating to the operation of the movable door. The processor is configured to generate operational values which are transmitted to and control the drive motor. The assembly further includes an arrangement for adjusting the operational values generated by the processor and transmitted to the drive motor. A modular harness connects the controller to the drive motor and to the sensors. An apparatus is operably coupled to the harness for identifying the particular drive motor and sensor technology used in combination with the automatic drive system.

In one form, the universal controller is configured such that the drive motor is disabled from operating when the movable door is moved to a breakaway position. In another form, the universal controller is preferably configured such that the movable door is inhibited from moving toward the closed position when a signal is received from one of the sensors indicating the presence of an object in the path of movement of the movable door. Preferably, the universal controller includes a keypad which allows for adjustment of the operational values generated by the processor and transmitted to the drive motor.

In another form, the universal controller is configured to control the speed the door moves immediately after the controller is initially installed. Preferably, the universal controller is configured to control the speed the door moves following a power loss to the controller.

Preferably, the operational values transmitted to the drive motor control the opening speed of the movable door. Moreover, the operational values transmitted to the drive motor preferably control the speed the door will move toward the open position after one of the sensors detects an obstruction in the path of movement of the door.

According to another aspect, there is provided a universal controller for an automatic door system wherein at least one door is carried on a door frame for movement along a predetermined path of movement between open and closed positions by an output drive of an electric motor. Sensor technology is provided as part of the automatic door system for monitoring variable conditions of the door and electric motor. The universal controller includes a housing for mounting the controller in a stationary position relative to the door frame and an assembly including a microprocessor carried by the housing for processing data operatively received from the sensor technology and relating to the operational characteristics of the movable door. The microprocessor is configured to generate operational values transmitted to the drive motor for controlling the output drive. The assembly further includes a manually operated arrangement for adjusting the operational values generated by the microprocessor and transmitted to the drive motor. A modular harness connects the controller to the drive motor and sensor technology. Moreover, an apparatus operably coupled to the harness is provided for identifying the particular drive motor and sensor technology used in combination with the automatic drive system.

Preferably, the universal controller further includes an alpha-numeric display for visually indicating various operating characteristics obtainable with the universal controller. In one form, the assembly of the universal controller is configured such that the output drive of the drive motor is disabled from operating when the door is moved to a breakaway position. In a preferred embodiment, the universal controller assembly is configured such that the door is inhibited from moving toward the closed position when a signal is received from the sensor technology indicating the presence of an object in the path of movement of the movable door. In another form, the arrangement on the universal controller assembly comprises a manually operated keypad which allows for adjustment of the operational values generated by the microprocessor and transmitted to the drive motor.

In a preferred form, the assembly of the universal controller is configured to control the speed the door moves immediately after the controller is initially installed. Moreover, the assembly of the universal controller is preferably configured to control the speed the door moves following a power loss to the universal controller.

Preferably, the operational values transmitted to the drive motor control the opening speed of the movable door. Moreover, the operational values transmitted to the drive motor preferably controls the speed the door will move toward the open position after one of the sensors detects an obstruction in the path of movement of the movable door.

According to another aspect of this invention, there is provided a method for automatically controlling operation of an automatic door system having at least one door movable between open and closed positions in response to operation of an output drive of a bi-directional drive motor. The automatic door system further includes sensor technology capable of producing data relating to operational characteristics of the door. The method comprises the acts of: providing a computer based processor carried by a housing, with the processor being capable of processing the data received from the sensor technology and generating operational values which are transmitted to the drive motor to control the output drive. The method also includes the act of: providing a manually operated arrangement coupled to the processor for adjusting the operational values generated by the processor and transmitted to the drive motor. Moreover, the method involves the act of: coupling the controller to the drive motor and to the sensor technology through a modular harness having connectors designed to validate the make and model of drive motor and specific sensor technology used in combination with the automatic door system. Furthermore, the method involves the act of: identifying the specific drive motor and sensor technology used in combination with the automatic drive system operably through use of a particular one of the modular harnesses.

The method for automatically controlling operation of an automatic door system furthermore involves having each modular harness configured with an apparatus used to set predetermined parameters for the processor prior to the particular one of the harnesses being operably coupled to the drive motor and sensor technology.

A primary feature of this invention relates to providing a universal controller which is compatible and works with a plurality of different automatic door manufactured systems thus reducing the time required to return an inoperative automatic door system to proper working order.

Another feature of the present invention relates to providing a universal controller for an automatic door system wherein the universal controller can identify the particular harness connected to the controller and validates the make and model number of drive motor and sensor technology used in combination with the automatic door system requiring repair.

Another feature of this invention relates to a methodology or process for automatically controlling operation of an automatic door system through a universal controller which utilizes one of different modular harnesses for connecting the universal controller to an existing drive motor and sensor technology on the automatic door system.

These and other aims, objects and advantages of the present invention will become more readily apparent from the following detailed description, drawings and appended claims.

DETAILED DESCRIPTION OF THE INVENTION

Figure 1:
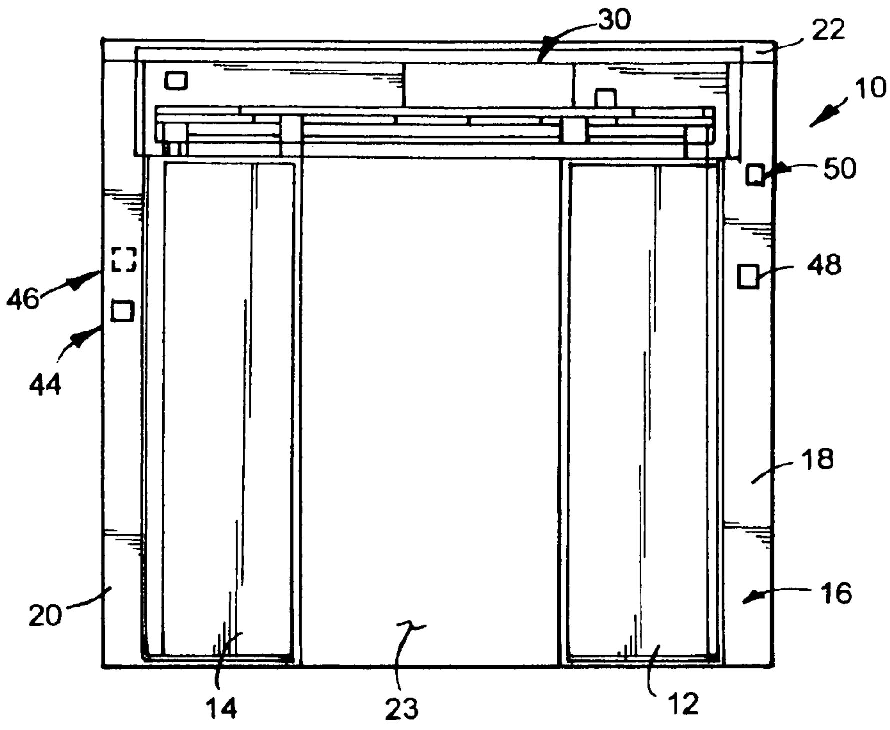
FIG. 1 is an elevational view of one form of an automatic door system.

While the present invention is susceptible of embodiment in multiple forms, there is shown in the drawings and will hereinafter be described a preferred embodiment of the invention, with the understanding the present disclosure sets forth an exemplification of the invention which is not intended to limit the invention to the specific embodiment illustrated and described.

Referring now to the drawings wherein like reference indicate like parts throughout the several views, there is shown in FIG. 1 a front view of one form of automatic door system, generally identified by reference numeral 10. The automatic door system 10, illustrated for exemplary purposes in FIG. 1, includes a bi-parting door arrangement including a first door 12 and a second door 14, shown in the open position in FIG. 1. Each door 12, 14 is mounted for sliding movement along a predetermined path of travel. Surrounding the doors 12, 14 is a suitable door frame 16. In the illustrated embodiment, the door frame 16 includes upstanding frame members 18 and 20 which are rigidly connected to each other by a top frame member 22 which acts as a cross-beam. The frame members 16, 18 and 20 define an ingress/egress opening 23 therebetween which is opened or closed depending upon the position of the doors 12, 14.

Figure 2:
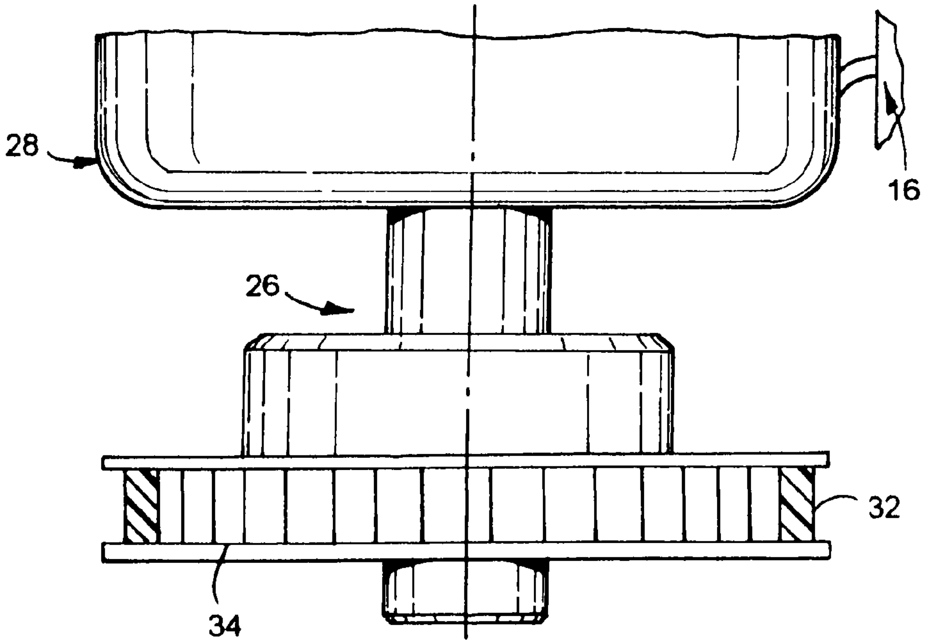
FIG. 2 is a side view of a drive motor operably associated with the automatic door system illustrated in FIG. 1.

The doors 12, 14 are opened and closed by an output drive 26 of a conventional motor 28 (FIG. 2) suitably mounted on the door frame 16. In the illustrated embodiment, an electric motor having a rotary drive output is illustrated for exemplary purposes. It should be appreciated, however, the present invention is equally applicable to a motor having a linear drive output. Regardless of the automatic door manufacturer, motor 28 is bi-directional, i.e. motor 28 is designed to operate in both forward and reverse directions, and at various or multiple speeds. According to the present invention, the output drive 26 of motor 28 is controlled by a universal controller 30 (FIG. 1). In the illustrated embodiment, the output drive 26 of motor 28 is operably connected to a pulley system used to power both doors 12, 14 between open and closed positions, synchronously, such that the controller 30 only needs to control a single drive motor 28.

Figure 3A:
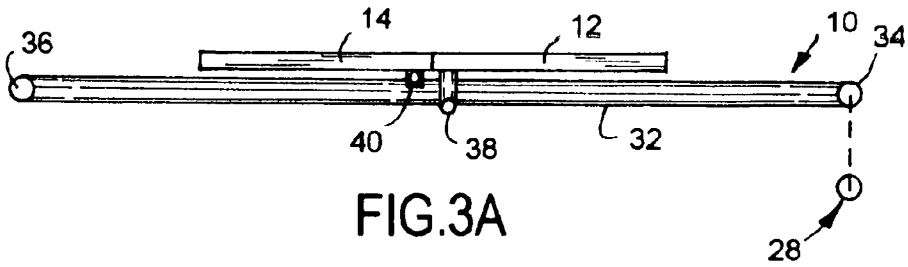
FIGS. 3A through 3D are top plan views schematically illustrating doors of the automatic door system in various operational positions.

A simplified top view of such a pulley system and its operation is depicted in FIGS. 3A through 3D, which is described with reference to the automatic door system of FIG. 1. In FIG. 3A, the doors 12and 14 are shown, from a top plan view, in a closed position. A chain 32 (or belt or other type of endless flexible member) is arranged above the doors 12, 14 and is wrapped about two stationary and laterally spaced pulleys 34 and 36 positioned toward opposed sides of and operably carried by the frame 16. A conventional roller bracket 38 is suitably fastened to the door 12 and a far side of chain or belt 32. Another conventional roller bracket 40, shorter in length than bracket 38, is suitably fastened to door 14 and the near side of the chain or belt 32.

In the illustrated embodiment, drive motor 28 is operably connected to pulley 34 of the pulley system. When the rotary drive 26 of drive motor 28 is energized, pulley 34 is caused to rotate which, in turn, linearly moves the belt 32. In the embodiment shown in FIG. 3A, and to open the doors 12, 14, the pulley 34 is drivingly rotated in a counterclockwise direction. Conversely, when the doors 12, 14 are to be closed, pulley 34 is drivingly rotated in a clockwise direction. Rotation of the drive pulley 34 causes the doors 12, 14 to move simultaneously. As the pulley 34 moves counterclockwise, the roller bracket 38 forces linear motion of the door 12 to the right, while roller bracket 40 forces linear motion of the door 14 to the left. Thus, the single rotary drive 26 of drive motor 28 can cause opening or closing movements of both doors 12, 14 along a predetermined path of travel simultaneously.

Figure 3B:
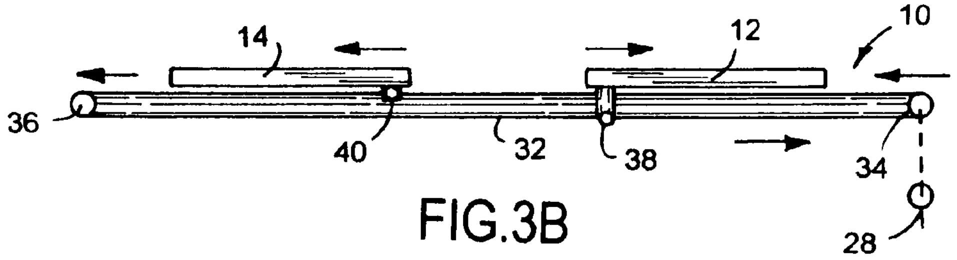
Figure 3C:
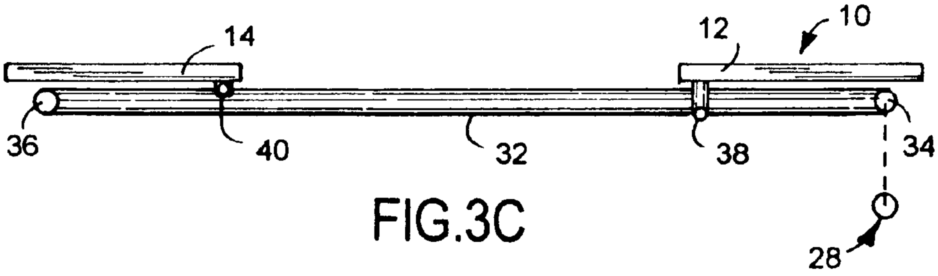
Figure 3D:
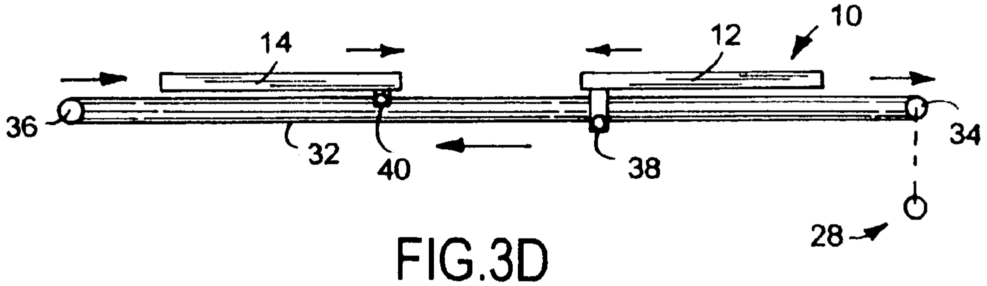

FIG. 3B illustrates a situation wherein the pulley 34 is drivingly rotated in a counterclockwise direction, and the doors 12, 14 are in motion in a partially open position. FIG. 3C depicts the situation wherein the drive pulley 34 has stopped rotating, and the doors 12, 14 are at rest in a fully open position. FIG. 3D depicts the situation where the drive pulley 34 is rotated by the drive motor 28 in a clockwise direction, and the doors 12, 14 are in motion, again in a partially open position, but moving toward the closed position shown in FIG. 3A.

In a preferred embodiment, the automatic door system 10 further includes a lock, depicted generally by reference numeral 42 in FIG. 1. Lock 42 is preferably provided to control certain features of the doors 12, 14. In a preferred form, lock 42 operates in different modes. In a "closed and locked" mode, lock 42 maintains the doors 12, 14 in a locked and closed position such that persons cannot pass through the ingress/egress opening 22. In an "automatic" mode, lock 42 permits the doors 12, 14 to operate in a manner controlled through sensor technology discussed below. In an "open and stay free" (motor "OFF") mode, lock 42 permits the doors 12, 14 to be manually opened and closed but the doors 12, 14 are not able to be automatically opened and closed. Suffice it to say, lock 42 is of a conventional design and, thus, no further details need be provided for a person skilled in the art to properly understand operation of thereof Although the doors 12, 14 are normally movable along a predetermined path of travel between the open and closed position, it should be appreciated the doors 12, 14 are also movable to a "breakaway position." As used herein and throughout, the phrase "breakaway position" means and refers to the doors 12, 14 being manually moved out of or swung from their normal path of travel so as to allow the opening 22 defined by the door frame 16 to remain substantially unobstructed by the doors 12, 14.

The automatic door system 10 further includes technology for monitoring variable conditions of the automatic door system 10. For example, and as shown schematically in FIG. 1, a sensor 44 is operably mounted in relation to the door opening 23 for detecting the presence of an object/person in the path of movement of or approaching from one side of the doors 12, 14. In one form, another sensor 46 is operably mounted in relation to the door opening 23 for detecting the presence of an object/person in the path of movement of or approaching from an opposite side of the doors 12, 14. As will be appreciated, sensors 44 and 46 Are each capable of generating a signal indicative of persons and/or objects being in the path of or approaching the path of movement of the doors 12, 14.

As will be appreciated by those skilled in the art, sensors 44 and 46 can include one or more sensors depending upon the particular automatic door manufacturer. Moreover, sensors 44 and 46 can be configured as a motion sensor, presence sensor, sound sensor, light sensor, OR an infrared pattern generator. Additionally, sensors 44 and 46 may be adjustable to provide patterns for different width doors or at different heights from the floor.

A sensor/switch 48 can also be provided in operable combination with the automatic door system 10 for indicating when the doors 12, 14 are moved to a breakaway condition or position. Still another sensor 50 can be used in operable combination with and for detecting and signaling the condition of the lock 42. Still other known sensor technology 52 is arranged in operable combination with the automatic door system 10 for monitoring the speed or rate of movement of the doors 12, 14 as they move between open and closed positions. As mentioned above, and depending upon the particular automatic door manufacturer, the multiple sensors and/or switches arranged in operable combination with the automatic door system 10 can be provided in a variety of types and can operate in a plurality of different modes and often vary between manufacturers.

The sensor technology associated with automatic door system can furthermore include a set of conventional sensors 54 which assist in detecting the current position of the doors 12, 14. In one form, the sensors 54 include a series of well known optical detectors 56 which assist in detecting the position of the doors 12, 14. Since the use of optical detectors in operable combination with automatic door systems is well known in the art, no further detail need be provided for an understanding of same to persons skilled in the art. Since the position of the doors 12, 14 is preferably symmetrical, optical detectors are typically only used in operable combination with one door; however, it is possible to have optical detectors arranged in operable combination with both doors 12, 14 or split between the two doors 12, 14. The optical detectors 56 are sometimes used to furthermore detect the moving speed or rate of the doors 12, 14. The precise position of the optical detectors can be determined empirically depending upon the size and weight of the doors as well as the width of the doorway or opening 22.

By combining data from multiple optical detectors 56, it is possible to determine the position of either door 12, 14 within a ceratin general tolerance, i.e. fully open, fully closed, nearly open, nearly closed, or partly open/closed. A variety of other devices may also be used by manufacturers to provide position information for the doors 12, 14, such as, for example, an optical reader placed above the door 12 (or 14) that reads special markings indicative of door position placed along a top edge of the door, or a distance detector placed on a side wall of the one of the doors that uses radar or any other conventional technique to measure the distance to the opposing door.

Figure 4:
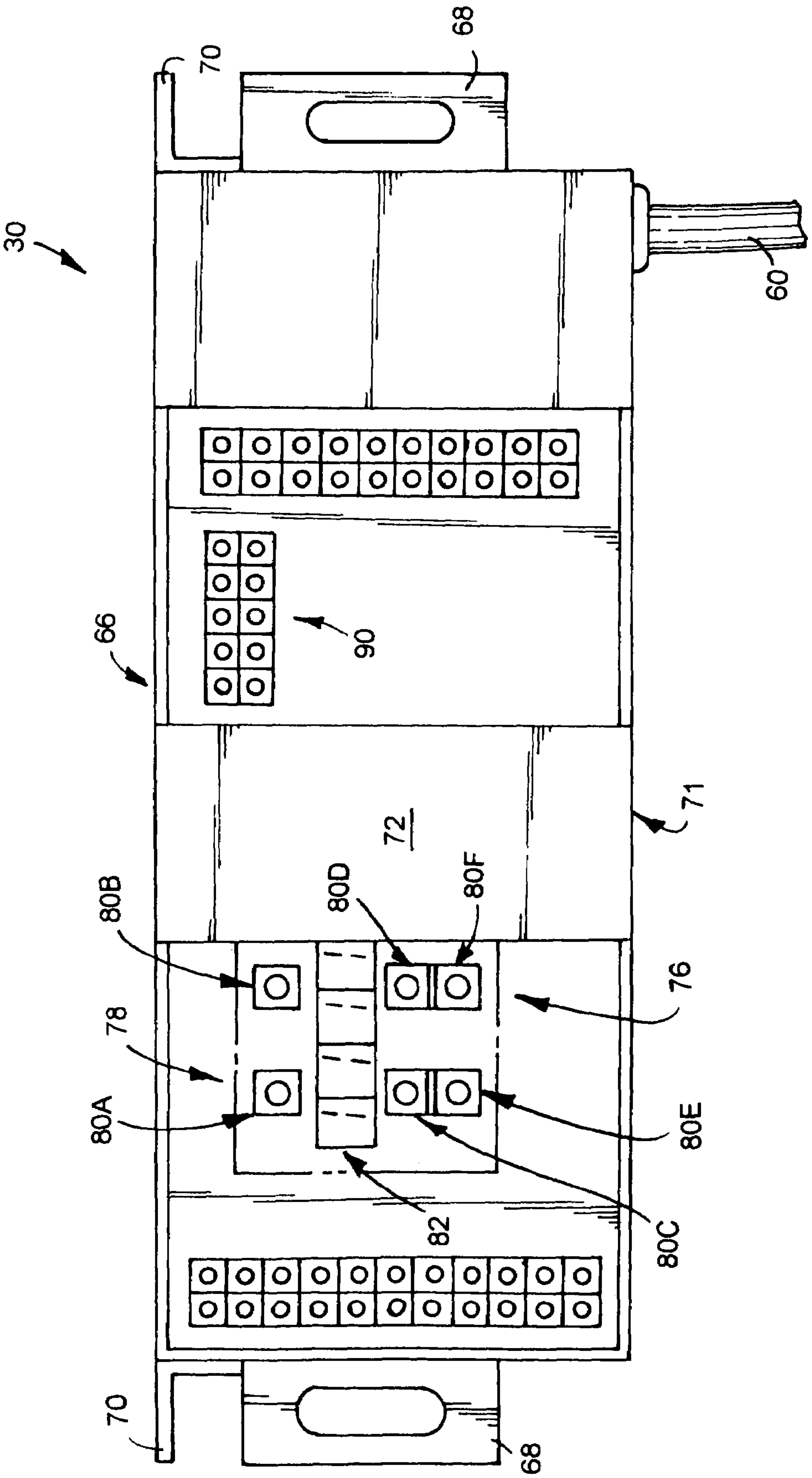
FIG. 4 is a plan view of one form of universal controller according to the present invention.
Figure 6:
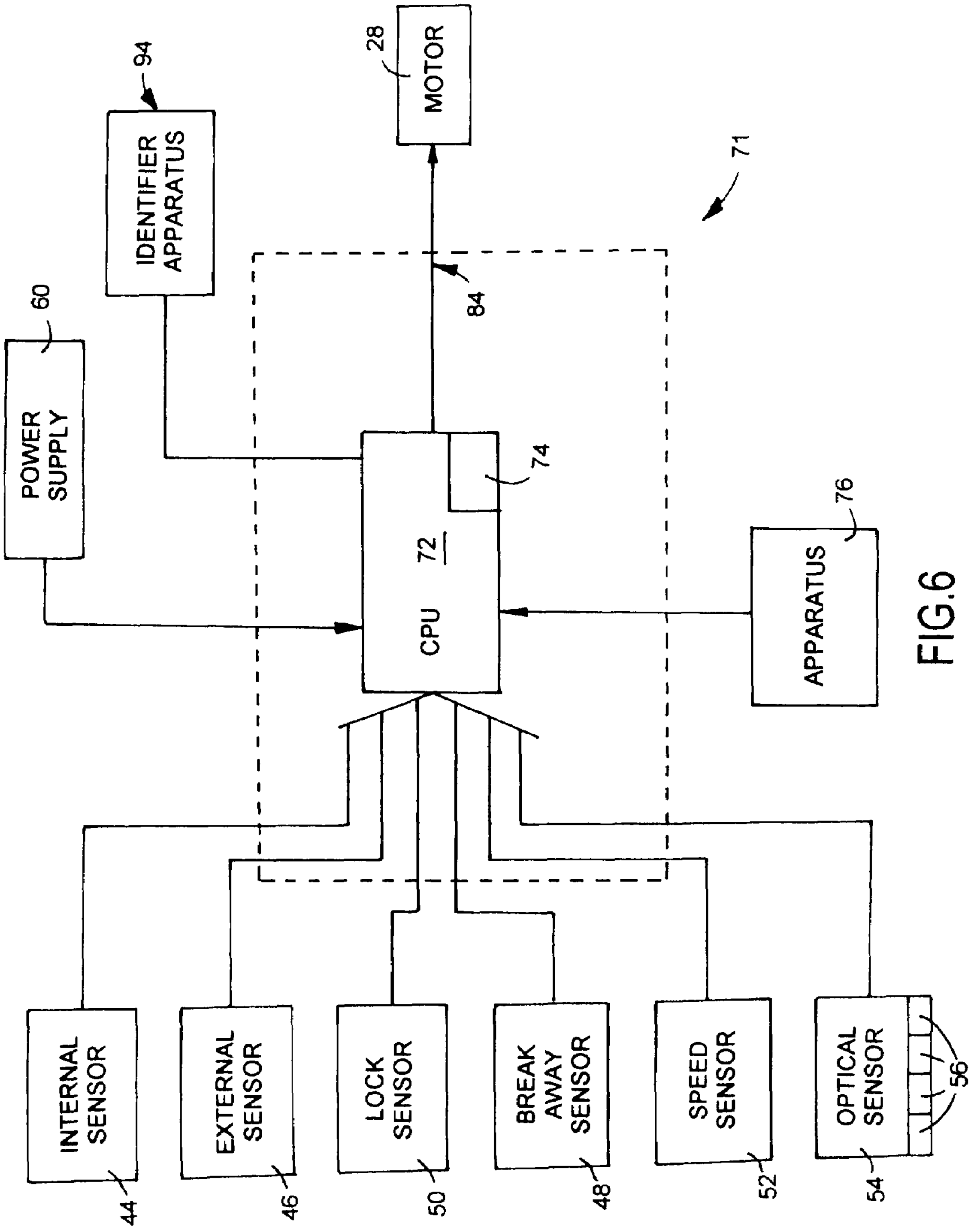
FIG. 6 is block diagram of the universal controller arranged in operable combination with an automatic door system.

According to the present invention, and after being installed in operable combination with the automatic door system 10, a universal controller 30 is operably coupled to a power supply 60 (FIGS. 4 and 6). The universal controller 30 operates in combination with and controls the output drive 26 of the drive motor 28 (FIG. 2) in response to sensor inputs received from the sensor technology, regardless of which particular motor or type of sensors are used on a particular automatic door system thus significantly adding to the versatility of the present invention to be used in combination with automatic door systems of various types.

As shown in FIG. 4, the universal controller 30 includes a housing 66. Housing 66 is preferably configured with a suitable number of apertured flanges 68, 70 for allowing the universal controller 30 to be mounted in a stationary position relative to the door frame 16 (FIG. 1). As indicated in FIGS. 4 and 6, controller 30 has an assembly 71 of operably related devices including a microprocessor or controller unit 72 which preferably includes programmable logic circuitry 74 (FIG. 6) but can take the form of any suitable hardware based or software based electronic controller. Depending upon data received from the sensor technology, circuitry 74 determines and generates operational values which are transmitted to and used to control the output drive 26 of motor 28. The sensor technology associated with the automatic door system 10 provides data, in the form of electrical input signals, to the controller 30 indicative of the particular condition being monitored or detected by the particular sensor, switch or detector.

Figure 5:
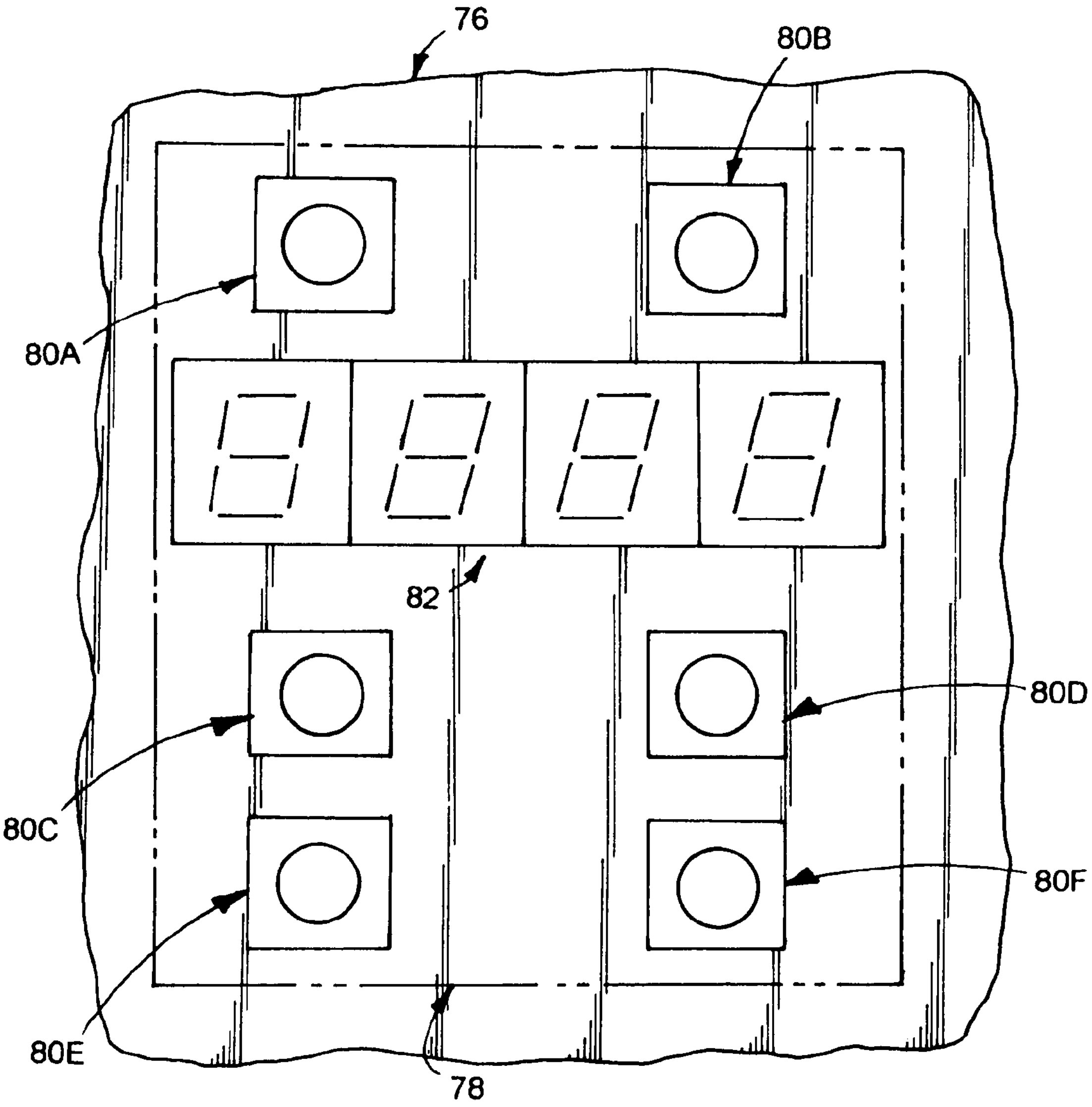
FIG. 5 is a an enlarged plan view of a manually operated key pad forming part of the universal controller.

The universal controller 30 further includes an apparatus 76 preferably carried by the housing 66 for adjusting the operational values or operating parameters transmitted to the drive motor 28 to control the output drive 26. In a preferred form shown in FIGS. 4 and 5, apparatus 76 includes a key pad 78 including a series of manually operated switches or buttons 80A, 80B, 80C, 80D, 80E and 80F operably coupled to the processor 72 for adjusting the computations performed by and the resultant operational values developed by the programmable logic circuitry 74 of processor 72. As shown in FIG. 5, apparatus 76 further includes an alpha-numeric display 82 for visually indicating various operating characteristics obtainable with the universal controller 30. That is, the alpha-numeric display 82 is responsive to an will provide a visual indication of changes being affected as through use of the key pad 78.

Figure 7:
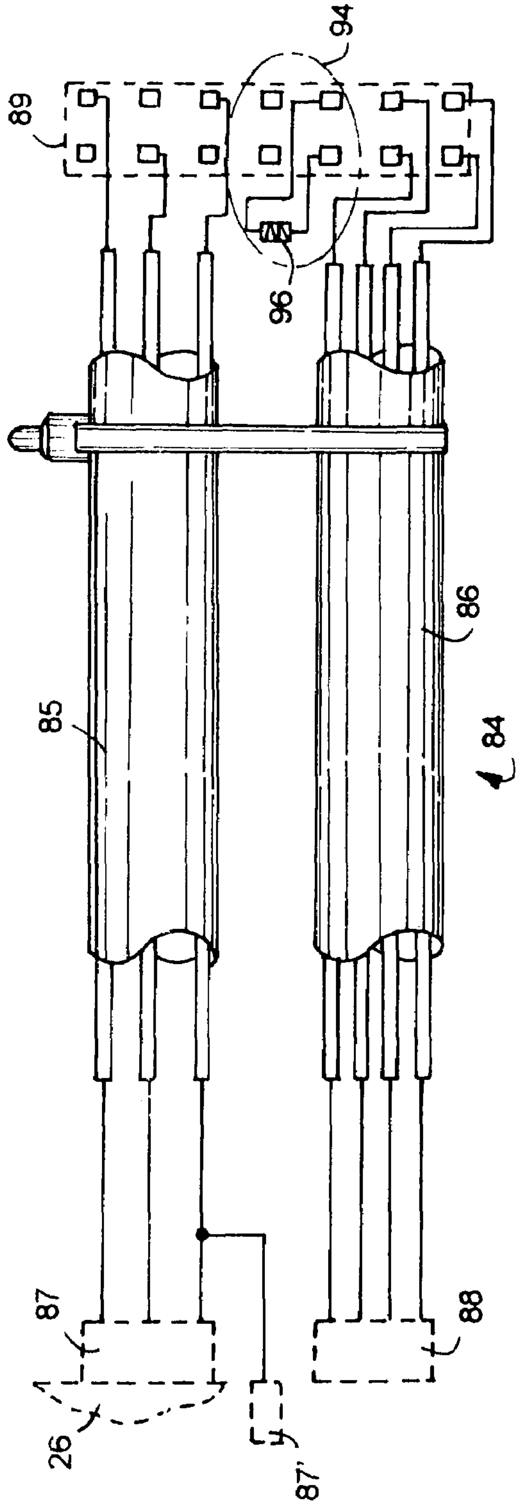
FIG. 7 is a schematic view of a modular apparatus used to interconnect the universal controller with a drive motor and sensor technology arranged in operable combination with the automatic door system.

According to the present invention, the universal controller 30 further includes a modular harness 84 for connecting controller 30 to the motor 28 and sensor technology used in combination with the automatic door system 10. As shown in FIG. 7, harness 84 operably includes first and second electrical conduits 85 and 86. Conduit 85 has a connector 87 at one end thereof for allowing harness 84 to be connected to a particular drive motor 28 of the automatic door system requiring repair. In the illustrated embodiment, conduit 85 further includes a second connector 87' for allowing harness 84 to be connected to a suitable ground. Conduit 86 has a connector 88 at one end thereof for allowing harness 84 to be operably connected to the sensor technology of the particular automatic door system requiring repair. It should be appreciated, and because different automatic door manufacturers typically use different motors and different sensor technology, the connectors 87, 87' and 88 on one modular harness for an automatic door system manufactured by a particular manufacturer are more likely than not to be non-compatible with a motor and sensor technology used by a different automatic door manufacturer. Moreover, and as will be appreciated by those skilled in the art, different models of automatic door systems—even though they are manufactured by the same automatic door manufacturer—frequently use different drive motors and sensor technology. As such, the connectors 87, 87' and 88 at the one end of the harness 84 typically dictate which modular harness is to be used in operable combination with each particular automatic door system. That is, for an automatic door system manufactured by Company "A", a modular harness 84 having connectors 87 and 88 which are compatible with a drive motor used by Company A" is used. For an automatic door system manufactured by Company "B", a second modular harness 84 having other connectors 87, 87' and 88 compatible with a drive motor used by Company "B" is used, etc. As will be appreciated, it will be easy and convenient for a repair person to maintain an inventory of modular harnesses 84 in inventory, thus, facilitating and establishing an operable connection between the universal controller 30 of the present invention to substantially any automated door system in need of repair.

As shown in FIG. 7, at the end opposite from connectors 87 and 88, conduits 85 and 86 are preferably joined to a connector 89 which, as shown, is common to both conduits 85 and 86. Connector 89 complements and mates with a conventional plug or connector 90 (FIG. 4) provided on the controller 30 and which is arranged in operable combination with the microprocessor or controller unit 72.

Control of the output drive 26 and the drive motor 28 by the controller 30 depends in part by the nature of the drive motor 28 used to move the doors 12, 14. As mentioned above, different automatic door manufacturers typically use different drive motors for their systems. That is, one automatic door manufacturer may use a drive motor that develops "X" door speed in response to "A" volts being delivered to the drive motor. In contrast, another automatic door manufacturer can use a different drive motor that develops "Y" door speed in response to "B" volts being delivered to the drive motor. Of course, yet another automatic door manufacturer may use still another type drive motor having its own unique capabilities. Having so many different automatic door manufacturers each using their own unique drive motor has heretofore caused significant problems when it comes time to repair the automatic door system.

The present invention, however, has identified this problem and has taken those steps required and necessary to solve same. With the present invention, the universal controller 30 further includes an apparatus, generally identified in FIGS. 6 and 7 by reference numeral 94, which is operably coupled to each modular harness leading from the CPU 72 for identifying the particular drive motor and sensor technology used in operable combination with the particular automatic door system 10 requiring repair. More specifically, apparatus 94 is used to identify the particular modular harness connected to the controller and validates, through he connectors 87, 87' and 88, the make and model of drive motor and sensor technology used in combination with the automatic door system in need of repair.

As shown in FIG. 7, in one form, apparatus 94 includes a resistor 96 of a predetermined given value associated with the connector 89 for identifying the voltages of drive motor 26, and and encoder types associated with the motor 26 along with the various switch and sensor arrangements arranged in operable combination with the automatic door system 10 requiring repair. It will be appreciated by those skilled in the art, rather than a resistor, apparatus 94 can include different passive components (e.g., a capacitor, a diode, inductor, or a combination of switches, or different pin locations on the connector 88, and/or other components) for identifying the voltages of the drive motor 26, encoder types associated with the motor 26, along with the various switch and sensor arrangements arranged in operable combination with the particular automatic door system 10 requiring repair without detracting or departing from the spirit and scope of the present invention.

As schematically depicted in FIG. 6, the apparatus 94 for identifying the voltages of drive motor 26, encoder types associated with the motor 26, along with the various switch and sensor arrangements arranged in operable combination with the automatic door system 10 requiring repair is operably connected to and directs a signal to the processor 72. As will be appreciated, the signal from apparatus 94 is used by the processor 72 to modulate the operational values transmitted to the drive motor 28 and thereby controlling the output drive 26 as a function of the particular type of motor 28 used in operable combination with the particular automatic door system being repaired and regardless of the particular manufacturer of the door system.

With the preferred form of the invention, and after being operably connected to the automatic door system 10, the alpha-numeric display 82 on the controller 30 provides a visual indication of the particular door system manufacturer along with a series of other helpful diagnostic indicators relating to the automatic door system. Through manipulation of the manually operated apparatus 76, the particular operational values developed by the processor 72 can be adjusted and operably modified whereby allowing the controller to be adapted to any particular automatic door system. As such, the time heretofore spent by the repair person ordering the particular controller coupled with the repeated trip times back and forth to the store wherein the not operable door is located can be significantly reduced, thus, resulting in cost savings to the store having such a faulty or otherwise inoperable door.

In one embodiment, assembly 71 of controller 30 is configured such that the processor or CPU 72 effectively disables the drive motor 28 from operating the doors 12, 14 when one or both of the doors 12, 14 is/are moved to a breakaway position. Moreover, assembly 71 is preferably configured such that either door 12, 14 is inhibited from moving toward a closed position when a signal from the sensor technology denotes or designates the presence of a object in the predetermined path of movement of the doors 12, 14. Additionally, the operational values provided to the drive motor 26 by the controller 30 preferably regulates or controls the speed each door 12, 14 toward the open position after the sensor technology detects an obstruction in the predetermined path of movement of the doors 12, 14. Preferably, and when the controller 30 is initially connected to the power source 60 or in the event of a power failure, the controller 72 is preferably configured to control the speed the doors 12, 14 move toward a closed position.

Although shown in operable combination with an automatic door system having bi-parting doors 12, 14, having a single output drive 26 operated by a single drive motor 28, it will be appreciated that the principals of the present invention equally apply to an automatic door system wherein each movable door of the automatic door system can be controlled by its own output drive and its own drive motor. Alternatively, it will be appreciated the teachings and principals of the present invention are also applicable to an automatic door system embodying a single sliding door. Additionally, it will be appreciated that the principals of the present invention equally apply to an automatic door system having a single revolving door, or a swinging door which uses a door closer spring for closing the door. Moreover, it will be appreciated that the principals of the present invention equally apply to an automatic door system that are powered both open and closed, such as accordion fold doors, for controlling ingress and egress through an opening defined by the door frame arranged in surrounding relation relative to such a door.

The ability of the harness 84 to validate the make and model number of the particular drive motor coupled with the ability of apparatus 94 to identify the type of drive motor 26, encoder types associated with the motor 26 along with the various switch and sensor arrangements arranged in operable combination with the automatic door system 10 facilitates the versatility of the universal controller 30 to be used with any automatic door system requiring repair without concern to compatibility between the particular door system and controller. The repair person merely selects an appropriate modular harness allowing the universal controller 30 to be connected to the connections on the drive motor, which modular harness 94 then signals ceratin values to the CPU 72 and thereafter the CPU 72 simply adjusts or modulates the logic circuitry 74 to determine operational values to be transmitted to the drive motor 28 and, ultimately, to the output drive 26 to control movement of the doors 12, 14 in an appropriate and proper manner.

The present invention also involves a method of process for automatically controlling operation of an automatic door system 10 having at least one door 12,14 movable between open and closed positions in response to operation of an output drive 26 of a bi-directional drive motor 28. The automatic door system 10 further includes sensor technology capable of producing data relating to operational characteristics of the movable door 12, 14. The method comprises the acts of: providing a controller 30 including a computer based processor 72 carried by a housing 66, with the processor 72 being capable of processing the data received from the sensor technology and generating operational values which are transmitted to the drive motor 28 to control the output drive 26 and, thus, the movable door 12, 14. The method also includes the act of: providing a manually operated arrangement 76 operably coupled to the processor 72 for adjusting the operational values generated by the processor 72 and transmitted to the drive motor 28. Moreover, the method involves the act of: coupling the controller 30 to the drive motor 28 and to the sensor technology through a modular harness 84 having connectors 87, 88 designed to validate the make and model of drive motor and specific sensor technology used in combination with the automatic door system 10. Furthermore, the method involves the act of: identifying the specific drive motor and sensor technology used in combination with the automatic drive system operably through use of a particular one of the modular harnesses 84. Preferably, the method for automatically controlling operation of the automatic door system furthermore involves having each modular harness 84 configured with an apparatus 94 for setting predetermined parameters for the processor 72 prior to the particular one of the harnesses being operably coupled to the drive motor and sensor technology.

From the foregoing, it will be observed that numerous modifications and variations can be made and effected without departing or detracting from the true spirit and novel concept of the present invention. Moreover, it will be appreciated, the present disclosure is intended to set forth an exemplification of the invention which is not intended to limit the invention to the specific embodiment illustrated. Rather, this disclosure is intended to cover by the appended claims all such modifications and variations as fall within the spirit and scope of the claims.

What is claimed is:

1. A universal controller for an automatic door system including at least one door carried on a door frame for movement along a predetermined path of movement between open and closed positions, a drive motor for moving said door between said open and closed positions, and a plurality of sensors for monitoring variable conditions of said door and motor, with each sensor being capable of producing a signal in response to a predetermined condition, said universal controller comprising:

a housing for mounting said controller in a stationary position relative to the door frame;

an assembly including a processor carried by said housing for processing data operatively received from said plurality of sensors and relating to the operation of said at least one movable door, with said processor being configured to generate operational values transmitted to and controlling said drive motor, and with said assembly further including an arrangement for adjusting the operational values generated by said processor and transmitted to said drive motor;

a modular harness for connecting said controller to said drive motor and to said sensors; and an apparatus operably associated with said modular harness for identifying the particular drive motor and sensors used in combination with the automatic drive system.

2. The universal controller according to claim 1, wherein said assembly is configured such that said drive motor is disabled from operating when said movable door is moved to a breakaway position.

3. The universal controller according to claim 1, wherein said assembly is configured such that said movable door is inhibited from moving toward the closed position when a signal is received from one of said sensors indicating the presence of an object in the predetermined path of movement of the movable door.

4. The universal controller according to claim 1, wherein said arrangement on said assembly comprises a keypad which allows for adjustment of the operational values generated by said processor and transmitted to said drive motor.

5. The universal controller according to claim 1, wherein said assembly is configured to control the speed said at least one movable door moves immediately after the controller is initially installed.

6. The universal controller according to claim 1, wherein said assembly is configured to control the speed said at least one movable door moves following a power loss to said universal controller.

7. The universal controller according to claim 1, wherein the operational values transmitted to said drive motor control the opening speed of said at least one movable door.

8. The universal controller according to claim 1, wherein the operational values transmitted to said drive motor controls the speed said at least one movable door will move toward the open position after one of said sensors detects an obstruction in the predetermined path of movement of said at least one movable door.

9. A universal controller for an automatic door system wherein at least one door is carried on a door frame for movement along a predetermined path of movement between open and closed positions by an output drive of a motor, and wherein a plurality of sensors are provided as part of the automatic door system for monitoring variable conditions of said door and said electric motor, and with each sensor being capable of producing an output signal in response to a predetermined condition, said universal controller comprising:

a housing for mounting said controller in a stationary position relative to said door frame;

an assembly including a microprocessor carried by said housing for processing data operatively received from said plurality of sensors and relating to the operational characteristics of said at least one movable door, with said microprocessor being configured to generate operational values transmitted to said motor thereby controlling said output drive, and with said assembly further including a manually operated arrangement for adjusting the operational values generated by said processor and transmitted to said motor;

a modular harness for connecting said controller to said motor and to said sensors; and an apparatus operably coupled to said modular harness for identifying the particular motor and sensors used in combination with the automatic door system.

10. The universal controller according to claim 9, wherein said assembly further includes an alpha-numeric display for visually indicating various operating characteristics obtainable with said universal controller.

11. The universal controller according to claim 9, wherein said assembly is configured such that said output drive is disabled from operating when said movable door is moved to a breakaway position.

12. The universal controller according to claim 9, wherein said assembly is configured such that said movable door is inhibited from moving toward the closed position when a signal is received from one of said sensors indicating the presence of an object in the predetermined path of movement of the movable door.

13. The universal controller according to claim 9, wherein said arrangement on said assembly comprises a manually operated keypad which allows for adjustment of the operational values generated by said processor and transmitted to said drive motor.

14. The universal controller according to claim 9, wherein said assembly is configured to control the speed said at least one movable door moves immediately after the controller is initially installed.

15. The universal controller according to claim 9, wherein said assembly is configured to control the speed said at least one movable door moves following a power loss to said universal controller.

16. The universal controller according to claim 9, wherein the operational values transmitted to said motor control the opening speed of said at least one movable door.

17. The universal controller according to claim 9, wherein the operational values transmitted to said motor controls the speed said at least one movable door will move toward the open position after one of said sensors detects an obstruction in the predetermined path of movement of said at least one movable door.

18. A method for automatically controlling operation of an automatic door system having at least one door movable between open and closed positions in response to operation of an output drive of a bi-directional drive motor, and wherein said automatic door system further includes sensor technology capable of producing data relating to operational characteristics of said door, said method comprising the acts of:

providing a computer based processor carried by a housing, with said processor being capable of processing the data received from said sensor technology and generating operational values transmitted to said drive motor for controlling said output drive, providing a manually operated arrangement coupled to said processor for adjusting the operational values generated by said processor and transmitted to said drive motor;

coupling said controller to said drive motor and to said sensor technology through a modular harness having connectors designed to validate the make and model of drive motor and specific sensor technology used in combination with the automatic door system; and identifying the specific drive motor and sensor technology used in combination with the specific sensor technology used in combination with the automatic door system; and identifying the specific drive motor and sensor technology used in combination with the automatic drive system operably through use of a particular one of said modular harnesses.

19. The method for automatically controlling operation of an automatic door system according to claim 18, wherein each of said modular harnesses is configured with an apparatus used to set predetermined parameters for said processor prior to said particular one of said harnesses being operably coupled to said drive motor and said sensor technology.

* * * * *